Sept. 28, 1926.

H. HERR ET AL 1,601,360

DECORATED PARASOL HANDLE

Filed April 8, 1926

Inventors
H. Herr.
N. Margoshes.
By Lacey & Lacey, Attorneys

Patented Sept. 28, 1926.

1,601,360

UNITED STATES PATENT OFFICE.

HARVEY HERR AND NATHAN MARGOSHES, OF LANCASTER PENNSYLVANIA, ASSIGNORS OF ONE-HALF TO LANCASTER PIPE MOUNT CO., OF LANCASTER, PENNSYLVANIA.

DECORATED PARASOL HANDLE.

Application filed April 8, 1926. Serial No. 100,738.

This invention relates to parasol handles and more particularly to a method of ornamenting the handles.

One object of the invention is to provide the handle with ornamentation which may be easily and quickly applied thereto with a minimum amount of labor.

This invention is illustrated in the accompanying drawing, wherein

Figure 1:
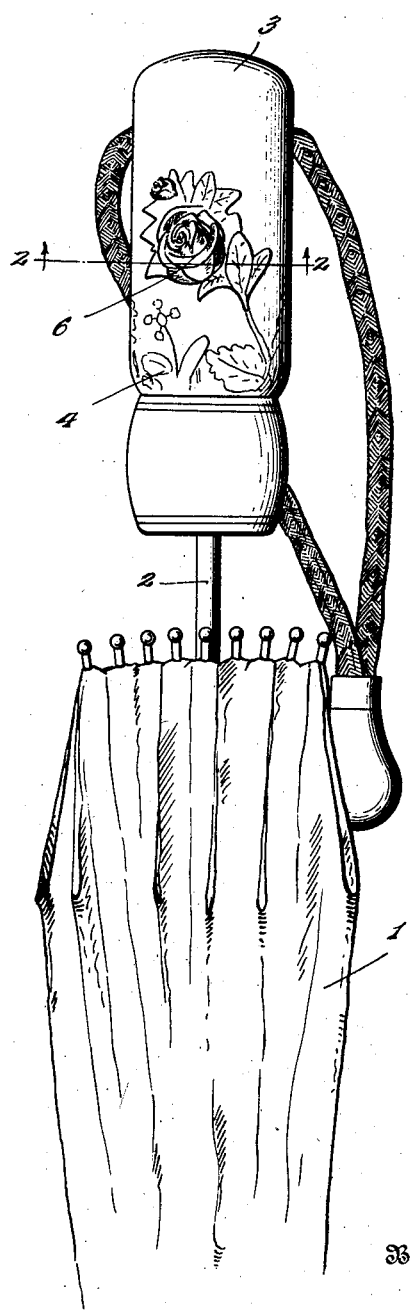
Figure 1 is a view in side elevation showing an umbrella or parasol having a handle decorated in accordance with this invention.
Figure 2:
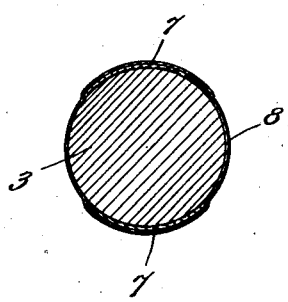
Fig. 2 is a transverse sectional view through the handle on the line 2—2 of Fig. 1.

The umbrella or parasol which is indicated in general by the numeral 1 is provided with the usual staff 2 carrying a handle or head 3. The handle or head is preferably formed of wood but may be of other materials and may be of any shape and configuration desired. In the present illustration the head or handle is circular in cross section so as to provide a continuous circumferential surface upon which the decorations are applied. The flowers and foliage 4 and the stalks and leaves 5 are painted upon the circumferential surface of the handle as these portions of the decorations may be easily painted by a person having a certain amount of artistic training but not a highly skilled artist. A flower, such as a rose or the like, can only be painted by a skilled artist and even when the painting is done by a skilled artist it requires a great deal of time to properly paint such a flower. Therefore, instead of having the flower 6 and the adjacent leaves, if any, painted directly upon the handle, we employ a wafer 7 decorated to represent the desired flower and adjacent leaves. These wafers are of the type used as stickers for sealing fancy wrapped packages and may be bought in commercial quantities. The sticker or stickers may be applied to the handle either before or after the foliage 4 and 5 is painted upon the handle and the stickers will, of course, be disposed in cooperating relation to the foliage 5 so that the stem or stalk of the flower will form a continuation of the painted stem and its leaves 5. After the decorating wafer or wafers have been applied to the handle and the foliage painted upon the handle has dried, a coating of transparent and waterproof material, such as shellac, clear varnish or the like, is applied to the entire handle and wafer or wafers and may be allowed to dry or may be subjected to a suitable baking process. The transparent coating assists in holding the sticker upon the handle and also serves to prevent it from being readily caught at its edges by the finger nails and torn loose from the handle.. When completed, the sticker merges into the painted foliage and unless closely inspected it will appear that the entire decoration of the handle is hand painted. It will, therefore, be seen that by employing this method an umbrella or parasol handle may have flowered decorations easily and quickly applied thereto. While it is stated that the decoration is applied to an umbrella or parasol handle, it will be obvious that the same method of decorating could be carried out in connection with other articles. It will also be obvious that decorations other than flowers may be applied to the parasol handle or other article by means of wafers appropriately decorated and that the wafers may form the entire decoration or only a portion thereof.

Having thus described the invention, we claim:

1. A method of ornamenting an article consisting of delineating a portion of a decoration upon the article and securing an element containing the remainder of the decoration to the article in cooperating relation to the decoration delineated thereon.

2. A method of ornamenting an article consisting of painting a portion of a decoration upon the article, securing a wafer having the remainder of the decoration provided thereon to the article in cooperating relation to the painted portion of the decoration, and applying a transparent water-proof coating to the article and wafer.

3. A method of ornamenting an article consisting of painting foilage upon the article, securing upon the article in cooperating relation to the foliage a wafer having a flower representation thereon, and applying a transparent water-proof coating to the article and wafer.

4. An article having decorative matter delineated thereon, a wafer bearing companion decorative matter applied to said article in cooperating relation to the decorative matter delineated thereon, and a transparent coating applied to said article and wafer.

In testimony whereof we affix our signatures.

HARVEY HERR. [L. S.]
NATHAN MARGOSHES. [L. S.]